US007294830B2

(12) United States Patent
Hieftje et al.

(10) Patent No.: US 7,294,830 B2
(45) Date of Patent: Nov. 13, 2007

(54) SIMULTANEOUS ACQUISITION OF CHEMICAL INFORMATION

(75) Inventors: Gary M. Hieftje, Bloomington, IN (US); Steven J. Ray, Bloomington, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 0 days.

(21) Appl. No.: 10/500,685

(22) PCT Filed: Jan. 2, 2003

(86) PCT No.: PCT/US03/00072

§ 371 (c)(1),
(2), (4) Date: Oct. 1, 2004

(87) PCT Pub. No.: WO03/058204

PCT Pub. Date: Jul. 17, 2003

(65) Prior Publication Data

US 2005/0035283 A1 Feb. 17, 2005

Related U.S. Application Data

(60) Provisional application No. 60/345,634, filed on Jan. 3, 2002.

(51) Int. Cl.
*B01D 59/44* (2006.01)

(52) U.S. Cl. ...................................... 250/287; 250/282

(58) Field of Classification Search ..................... None
See application file for complete search history.

(56) References Cited

U.S. PATENT DOCUMENTS

| | | | | |
|---|---|---|---|---|
| 3,796,872 | A * | 3/1974 | Merren | 250/283 |
| 3,886,357 | A * | 5/1975 | Naito | 250/285 |
| 5,654,545 | A | 8/1997 | Holle et al. | |
| 5,821,534 | A | 10/1998 | Park | |
| 6,040,575 | A * | 3/2000 | Whitehouse et al. | 250/288 |
| 6,326,615 | B1 | 12/2001 | Syage et al. | |
| 6,469,297 | B1 * | 10/2002 | Kato | 250/288 |
| 6,777,670 | B1 * | 8/2004 | Farnsworth | 250/285 |

* cited by examiner

*Primary Examiner*—David Vanore
(74) *Attorney, Agent, or Firm*—Barnes & Thornburg LLP

(57) ABSTRACT

A method and apparatus for operating a mass spectrometer include providing at least two different ion sources, and coupling ion streams simultaneously from the at least two different ion sources to the spectrometer. Another method of operating a spectrometer includes a first coupling an ion stream from a first one of the ion sources into the spectrometer, next coupling an ion stream from a second one of the ion sources into the spectrometer, next coupling an ion stream from the second one of the ion sources into the spectrometer, and next coupling an ion stream from the first one of the ion sources into the spectrometer.

28 Claims, 9 Drawing Sheets

SIMULTANEOUS ACQUISITION OF CHEMICAL INFORMATION

This application is a U.S. national counterpart application of international application Ser. No. PCT/US2003/000072 filed Jan. 2, 2003, which claims priority to U.S. Provisional Application No. 60/345,634 filed Jan. 3, 2002. The entirety of these applications is hereby incorporated by reference.

CROSS-REFERENCE TO RELATED APPLICATIONS

This application claims priority under 35 U.S.C. § 119(e) to U.S. Provisional Patent Application Ser. No. 60/345,634 filed Jan. 3, 2002, the disclosure of which is hereby incorporated herein by reference.

1. Field of the Invention

This invention relates to the acquisition of chemical information. It is disclosed in the context of the acquisition of multiple distinct forms of chemical information with respect to a mixture, for example, in order to identify specific metals, their concentrations, their associations and chemical speciation. However, it is believed to be useful in other applications as well.

2. Background of the Invention

It is well recognized in the scientific community that metals play critical, but sometimes indefinite, roles in myriad biochemical processes and in dictating the properties of materials. Therefore, understanding of processes involving metals, and of the presence of metals in chemicals, is of critical importance in such fields as environmental monitoring and pharmaceutical and medicinal chemistry. The utility of integrated means for determining complete speciation information of a metal within a sample is clear. Speciation, as used herein, generally means the chemical form(s) that a metal takes within a sample, for example, the metal's oxidation states and the form(s) of the metal bound to organic and/or inorganic matter.

Various methods and apparatus for chemical analysis are known. Current methods typically employ the successive separate acquisition of elemental and metal-speciation information taking the general form of a mixture separation followed by analysis for elemental or speciation data. For example, a mixture might first be subjected to separation by liquid chromatography and the effluent analyzed for metals by inductively-coupled plasma mass spectrometry. The identical mixture separation is again accomplished and the effluent analyzed for speciation data by electrospray ionization mass spectrometry. In order to compare these two separations and thereby determine the concentration and identity of metal-associated species within the mixture, peak retention-time matching is conducted and the analysis is thereby open to associated error due to separation inconsistencies. These types of procedures are therefore necessarily somewhat inefficient, requiring, as they do, two separate instruments, they are somewhat costly, inefficient in their use of analyes, and they are time-consuming.

There are also, for example, the methods and apparatus illustrated and described in the following references: UK Patent Application GB 2,273,200 A; Casiot, C., Vacchina, V., Chassaigne, H., Szpunar, J., Potin-Gautier, M., Lobinski, R., "An Approach to the Identification of Selenium Species in Yeast Extracts Using Pneumatically-Assisted Electrospray Tandem Mass Spectrometry," Anal. Commun., 1999, vol. 36, pp. 77-80; Houk, R. S., "Electrospray and ICP-Mass Spectrometry: Enemies or Allies?," Spectrochim. Acta, Part B, 1998, vol. 53B, pp. 267-271; Elgersma, J. W., Kraak, J. C., Poppe, H., "Electrospray as Interface in the Coupling of Micro High-Performance Liquid Chromatography to Inductively Coupled Plasma Atomic Emission Spectrometry," J. Anal. At. Spectrom., 1997, vol. 12, pp. 1065-1068; Brown, F. B., Olson, L. K., Caruso, J. A., "Comparison of Electrospray and Inductively Coupled Plasma Sources for Elemental Analysis with Mass Spectrometric Detection," J. Anal. At. Spectrom., 1996, vol. 11, pp. 633-641; Chassaigne, H., Lobinski, R., "Speciation of Metal Complexes with Biomolecules by Reversed-Phase HPLC with Ion-Spray and Inductively Coupled Plasma Mass Spectrometric Detection," Fresenius' J. Anal. Chem., 1998, vol. 361, pp. 267-273; Kim, T., Tolmachev, A. V., Harkewicz, R., Prior, D. C., Anderson, G., Udseth, H. R., Smith, R. D., Bailey, T. H., Rakov, S., Futrell, J. H., "Design and Implementation of a New Electrodynamic Ion Funnel," Anal. Chem., 2000, vol. 72, pp. 2247-2255; Tolmachev, A. V., Kim, T., Udseth, H. R., Smith, R. D., Bailey, T. H., Futrell, J. H., "Simulation-Based Optimization of the Electrodynamic Ion Funnel for High Sensitivity Electrospray Ionization Mass Spectrometry," Int. J. Mass Spectrom., 2000, vol. 203, pp. 31-47; Lynn, E. C., Chung, M.-C., Han, C.-C., "Characterizing the Transmission Properties of an Ion Funnel," Rapid Commun. Mass Spectrom, 2000, vol. 14, pp. 2129-2134; Kim, T., Udseth, H. R., Smith, R. D., "Improved Ion Transmission from Atmospheric Pressure to High Vacuum Using a Multicapillary Inlet and Electrodynamic Ion Funnel Interface," Anal. Chem., 2000, vol. 72, pp. 5014-5019; Voyksner, R. D., Lee, H., "Investigating the Use of an Octupole Ion Guide for Ion Storage and High-Pass Mass Filtering to Improve the Quantitative Performance of Electrospray Ion Trap Mass Spectrometry," Rapid Commun. Mass Spectrom., 1999, vol. 13, pp. 1427-1437; Cha, B., Blades, M., Douglas, D. J., "An Interface with a Linear Quadrupole Ion Guide for an Electrospray-Ion Trap Mass Spectrometer System," Anal. Chem., 2000, vol. 72, pp. 5647-5654; Michael, S. M., Chien, B. M., Lubman, D. M., "Detection of Electrospray Ionization Using a Quadrupole Ion Trap Storage/Reflection Time-Of-Flight Mass Spectrometer," Anal. Chem., 1993, vol. 65, pp. 2614-2620; Draper, W. M., "Electrospray Liquid Chromatography Quadrupole Ion Trap Mass Spectrometry Determination of Phenyl Urea Herbicides in Water," J. Agric. Food Chem., ACS ASAP; Boue, S. M., Stephenson, J. L. Jr., Yost, R. A., "Pulsed Helium Introduction into a Quadrupole Ion Trap for Reduced Collisional Quenching During Infrared Multiphoton Dissociation of Electrosprayed Ions," Rapid Commun. Mass Spectrom., 2000, vol. 14, pp. 1391-1397; Egan, M. J., Kite, G. C., Porter, E. A., Simmonds, M. S. J., Howells, S., "Electrospray and APCI Analysis of Polyhydroxyalkaloids Using Positive and Negative Collision Induced Dissociation Experiments in a Quadrupole Ion Trap," Analyst (Cambridge, U. K.), 2000, vol. 125, pp. 1409-1414; Quarmby, S. T., Yost, R. A., "Fundamental Studies of Ion Injection and Trapping of Electro-Sprayed Ions on a Quadrupole Ion Trap," Int. J. Mass Spectrom., 1999, vol. 190, pp. 81-102; Shen, J., Brodbelt, J. S., "Post-Column Metal Complexation of Quinolone Antibiotics in a Quadrupole Ion Trap," Rapid Commun. Mass Spectrom., 1999, vol. 13, pp. 1381-1389; Ding, J., Vouros, P., "Advances in CE/MS," Anal. Chem., 1999, vol. 71, pp. 378A-385A; Purves, R. W., Li, L., "Development of an Ion Trap/Linear Time-Of-Flight Mass Spectrometer with Electrospray Ionization for Micro-Column Liquid Chromatography Detection," J. Microcolumn Sep., 1995, vol. 7, pp. 603-610; Chien, B. M., Lubman, D. M., "Analysis of the Fragments from Collision-Induced Dissociation of Electrospray-Produced Peptide Ions Using a Quadrupole Ion Trap Storage/Reflection Time-Of-Flight Mass Spectrometer," Anal. Chem., 1994, vol. 66, pp. 1630-1636; Myers, D. P., Li, G., Yang, P., Hieftje, G. M., "An Inductively Coupled Plasma-Time-Of-Flight Mass Spectrometer for Elemental Analysis. Part I: Optimization and Characteristics," J. Am. Soc. Mass Spectrom., 1994, vol. 5, pp. 1008-1016; http://www.srv.net/~klack/simion.html, and particularly the SIMION software package which is available through Scientific Instrument Services, Inc., http://www.sisweb.com/simion.htm; and, the GBC model Optimass 8000 ICP-TOFMS instrument, available from GBC Scientific Equipment, http://www.gbcsci.com/products/icp_tof/optimass.asp; and Leco ICP-TOFMS, http://www.leco.com/icp-tofms/renaissance/renaissance.htm.

The disclosures of these references are hereby incorporated herein by reference. This listing is not intended to be a representation that a thorough search of all relevant prior art has been made. Nor is this listing intended to be a representation that no more relevant prior art than that listed exists. Nor is this listing intended to be a representation that the listed prior art is material to patentability. Nor should any of such representations be inferred.

DISCLOSURE OF THE INVENTION

According to one aspect of the invention, a method is provided for acquiring chemical information with a mass spectrometer having (i) a first ionization source for creating ions, (ii) a second ionization source for creating ions, (iii) a first detector for detecting ions, and (iv) a second detector for detecting ions. The method comprises (a) simultaneously sampling ions created by said first ionization source and said second ionization source so as to produce a first ion sample and a second ion sample, and (b) simultaneously detecting ions from said first ion sample with said first detector and ions from said second ion sample with said second ion detector.

According to another aspect of the invention, a spectrometer includes apparatus for coupling at least two different ion streams simultaneously to the spectrometer from at least two different ion sources.

Illustratively according to this aspect of the invention, the spectrometer comprises a time-of-flight mass spectrometer.

Illustratively according to this aspect of the invention, one of the at least two different ion sources comprises an electrospray ionization source.

Illustratively according to this aspect of the invention, one of the at least two different ion sources comprises an inductively coupled plasma source.

Illustratively according to this aspect of the invention, one of the at least two different ion sources comprises an electron-impact ionization apparatus.

According to another aspect of the invention, a method of operating a spectrometer includes providing at least two different ion sources, and coupling ion streams simultaneously from the at least two different ion sources to the spectrometer.

Illustratively according to this aspect of the invention, the method comprises a method of operating a time-of-flight mass spectrometer.

Illustratively according to this aspect of the invention, providing at least two different ion sources comprises providing an electrospray ionization source.

Illustratively according to this aspect of the invention, providing at least two different ion sources comprises providing an inductively coupled plasma source.

Illustratively according to this aspect of the invention, providing at least two different ion sources comprises providing an electron-impact ionization apparatus.

According to another aspect of the invention, a method of operating a spectrometer includes providing at least two different ion sources, first coupling an ion stream from a first one of said ion sources into the spectrometer, next coupling an ion stream from a second one of said ion sources into the spectrometer, next coupling an ion stream from the second one of said ion sources into the spectrometer, and next coupling an ion stream from the first one of said ion sources into the spectrometer.

Illustratively according to this aspect of the invention, the method comprises a method of operating a time-of-flight mass spectrometer.

Illustratively according to this aspect of the invention, the method further includes developing mass spectra from the coupling of ion streams from said second one of said ion sources into the spectrometer while coupling an ion stream from the first one of said ion sources into the spectrometer.

Illustratively according to this aspect of the invention, coupling an ion stream from one of said ion sources into the spectrometer comprises coupling an ion stream from an electrospray ionization source into the spectrometer.

Illustratively according to this aspect of the invention, coupling an ion stream from one of said ion sources into the spectrometer comprises coupling an ion stream from an inductively coupled plasma source into the spectrometer.

BRIEF DESCRIPTION OF THE DRAWINGS

The invention may best be understood by referring to the following detailed descriptions of illustrative embodiments and drawings which illustrate the invention. In the drawings.

DETAILED DESCRIPTIONS OF ILLUSTRATIVE EMBODIMENTS

The invention seeks to provide methods and apparatus for rapidly acquiring information on speciation of elements, for example, metals, within complex mixtures of environmental, biological, pharmacological or other interest for purposes such as screening, unambiguous detection of target species, or generally whenever analyses requiring knowledge of both elemental and speciation information are desired. The invention employs established separation methods and a novel detection system for chemical analysis. The detection system includes a time-of-flight mass spectrometer (hereinafter sometimes TOFMS) and multiple ion sources. The present invention provides elemental and metal-speciation information with each single separation. Thus, the analysis is freer from error due to run-to-run variations and the identity of metal-containing species can be accomplished by direct comparison. Because the elemental identity and metal speciation data represent orthogonal types of information, the incomplete separation of components in a mixture can be overcome by deconvolution techniques. Because the illustrated embodiments contemplate a single instrument, analyses are completed more efficiently and rapidly with less associated cost.

Figure 1:
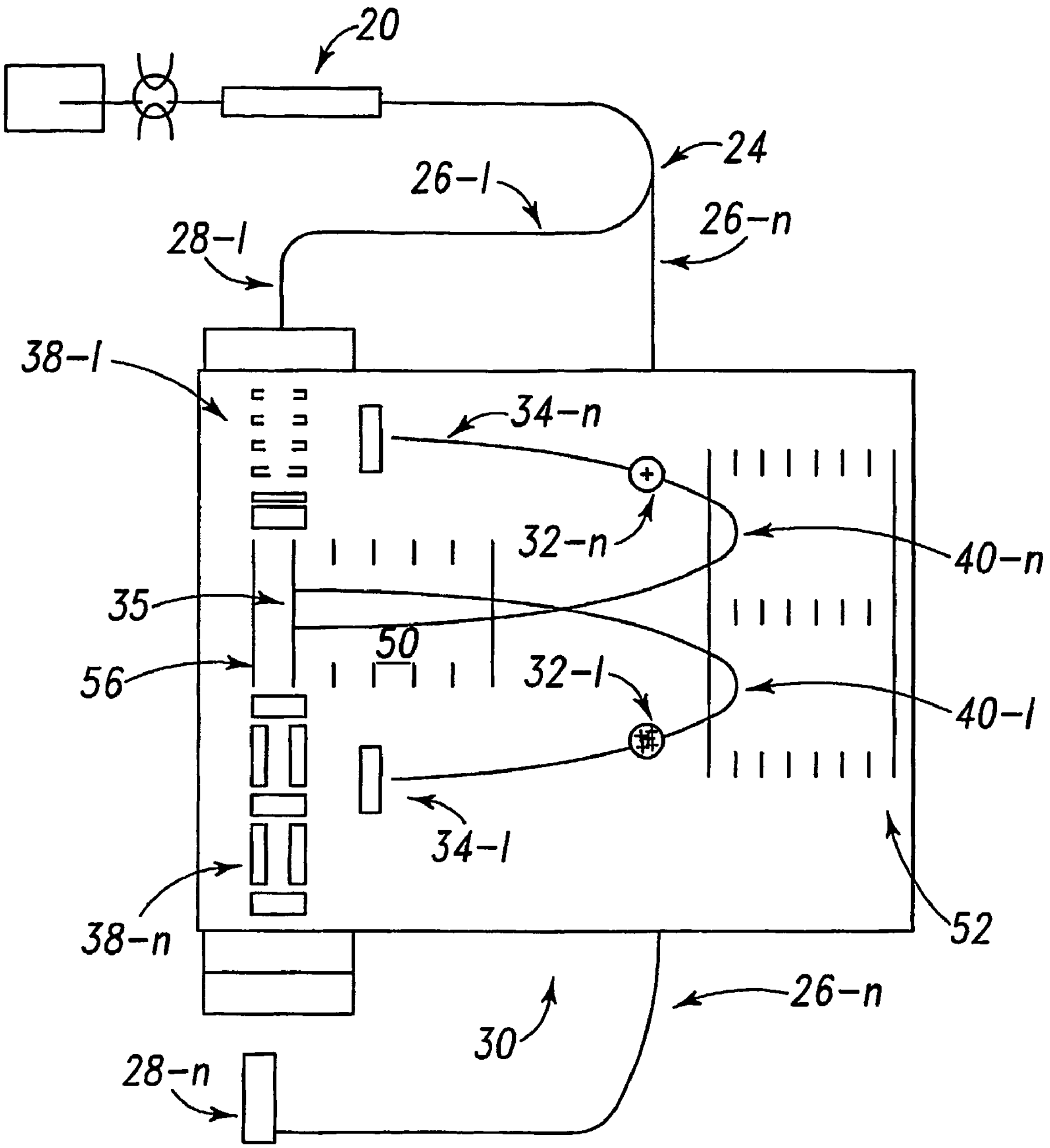
FIG. 1 illustrates a method for acquiring chemical information comprising a mixture separation step and a mass spectrometric analysis step.

A method for acquiring chemical information comprising a mixture separation step and a mass spectrometric analysis step is illustrated diagrammatically in FIG. 1.

A separation step 20 separates distinct chemical species that contain a common metal from each other. Significantly, the method and apparatus of the invention do not require the comprehensive separation of all species in the mixture, since the ability to match a single metal, elemental or isotopic profile with a corresponding molecular ion spectrum overcomes problems of non-ideal separations 20. Illustratively, the mixture separation 20 can be accomplished by liquid chromatography, capillary electrophoresis, or any number of other separation methods 20 known in the art.

Upon separation 20, the effluent is split 24 with a predetermined volume ratio and each separate stream 26-1, 26-2, . . . 26-n is injected into one of two or more different ionization sources 28-1, 28-2, . . . 28-n. Generally, the sources 28-1, 28-2, . . . 28-n are selected based upon their ability to provide independent types of chemical information. Illustratively, one of the sources 28-1, 28-2, . . . 28-n, for example, an electrospray ionization source 28-1, is selected for its ability to provide speciation information, while another of the sources 28-1, 28-2, . . . 28-n, for example, an inductively coupled plasma source 28-n, is selected for its ability to provide very sensitive elemental determination. The multiple sources 28-1, 28-2, . . . 28-n are sampled simultaneously using a single mass spectrometer 30. The ions 32-1, 32-2, . . . 32-n produced by each source 28-1, 28-2, . . . 28-n, respectively, are detected by respective detectors 34-1, 34-2, . . . 34-n. Illustratively, detection maybe conducted in a parallel simultaneous manner, or sequentially in a time-division multiplexed manner. In either event, the desired chemical information is obtained virtually simultaneously from a single separation 20.

Separation

While the method and apparatus 24, 26-1, 26-2, . . . 26-n, 28-1, 28-2, . . . 28-n, 30, 34-1, 34-2, . . . 34-n of the invention are also useful in the analysis of a single chemical compound, they can be used with a separation method and apparatus 20. This permits relatively unambiguous identification of analytes within a mixture. This also minimizes intra-separation error. This also permits the user to benefit from the orthogonal, or independent, nature of the chemical information which is available from the multiple different ionization sources and methods. Many different ionization methods and apparatus are routinely practiced, are described in the literature, and one or more appropriate ones can be selected for the application(s) in which it (they) have been demonstrated to be effective. The illustrated embodiment employs two different ionization methods and apparatuses, an electrospray ionization (hereinafter sometimes ESI) method and apparatus 28-1, and an inductively coupled plasma (hereinafter sometimes ICP) method and apparatus 28-n. As noted in, for example, Casiot, C., et al, "An Approach to the Identification of Selenium Species in Yeast Extracts Using Pneumatically-Assisted Electrospray Tandem Mass Spectrometry," supra.; Houk, R. S., "Electrospray and ICP-Mass Spectrometry: Enemies or Allies?," supra.; Elgersma, J. W., et al, "Electrospray as Interface in the Coupling of Micro High-Performance Liquid Chromatography to Inductively Coupled Plasma Atomic Emission Spectrometry," supra.; Brown, F. B., et al, "Comparison of Electrospray and Inductively Coupled Plasma Sources for Elemental Analysis with Mass Spectrometric Detection," supra.; and, Chassaigne, H., et al, "Speciation of Metal Complexes with Biomolecules by Reversed-Phase HPLC with Ion-Spray and Inductively Coupled Plasma Mass Spectrometric Detection," supra., these methods and apparatuses 28-1, 28-n are complementary, both in the types of information that they provide and in their solution uptake requirements. For example, when a high-performance liquid chromatography 20 (hereinafter sometimes HPLC) separation is employed, of a total effluent flow of, for example, 1 mL/min., approximately 100 μL/min. can be supplied to ESI apparatus 28-1, with the remainder being supplied to ICP apparatus 28-n. Both the elemental profile and the molecular identity can be monitored simultaneously, or virtually simultaneously, and deconvolution methods and apparatus can be employed to correct for incomplete separation. In order for the method and apparatus 20, 24, 26-1, 26-2, . . . 26-n, 28-1, 28-2, . . . 28-n, 30, 34-1, 34-2, . . . 34-n to produce reliable results, the output of each source 28-1, 28-2, . . . 28-n must present the same chromatogram with the greatest possible coincidence. Therefore, any convolutions introduced by the source stream splitting operation 24, for example, through dead volume, any delay time between source stream introduction into the sources 28-1, 28-2, . . . 28-n, or any delay time caused by the stream source itself must either be characterized or minimized, or both. Such characterizations can be accomplished through the passage of a standard source stream through the method and apparatus 24, 26-1, 26-2, . . . 26-n, 28-1, 28-2, . . . 28-n, 30, 34-1, 34-2, . . . 34-n prior to analysis of the unknown.

Ionization Sources

As previously noted, the illustrated embodiment employs ESI and ICP as ionization sources 28-1, 28-n, respectively. These are attractive methods and apparatus because of their complementary nature. The ESI method and apparatus 28-1 produce multiply-charged molecular ions and molecular fragment ions 32-1. This permits chemical structure information to be obtained. The ICP method and apparatus 28-n produce principally atomic ions 32-n. This permits elemental and isotopic information to be obtained for most elements, and with considerable sensitivity. Thus, a combination of such methods and apparatus can be employed with success as long as they can be made to produce orthogonal, or independent, types of chemical information. For example, vaporous samples, such as those from gas chromatography, can be injected into an electron-impact ionization apparatus 28-k, $1 \leqq k \leqq n$, and into an ICP apparatus 28-n to obtain molecular fragmentation and elemental information virtually simultaneously. Generally, the choice of sources 28-1, 28-2, . . . 28-n employed will depend on the value of chemical information obtainable and the applicable analyte types, mass requirements and TOFMS operating requirements.

TOFMS

A time-of-flight mass spectrometer 30 has several advantages. Among these are that a TOFMS 30 is capable of extremely rapid mass-spectral acquisition, which permits the rapid transients produced by the separation to be completely characterized. Because all of the masses are extracted to be analyzed at the same instant, a TOFMS 30 is generally recognized as being unaffected by spectral skew error or the error associated with the scanning acquisition of the mass-spectral data during the time-dependent concentration profile of a transient signal. Additionally, the simultaneous extraction of all masses of interest permits greater precision to be achieved in ratioing methods and apparatus, such as isotope dilution or internal standardization. These advantages make the TOFMS 30 useful in the virtually complete characterization of complex mixtures and with systems producing rapid transients, for example, as in rapid screening of combinatorial libraries.

The TOFMS 30 geometry permits rapid interdigitation of the acquisition of multiple, for example, two, distinct types of chemical information from multiple, again, for example, two, different sources 28-1, 28-n. Such an application requires the observation of multiple, again, illustratively two, substantially different mass-to-charge ranges with large dynamic range and with high temporal resolution. Use of the TOFMS 30 geometry permits the simultaneous or virtually simultaneous (rapidly alternating) acquisition of the data from multiple, for example, two, distinct ionization sources 28-1, 28-n, under investigation, owing in part to the rapid spectral generation rate of the TOFMS 30 and in part to the instrument's use of electric fields that can be rapidly changed. TOFMS 30 geometry also permits modification of the duty cycle with which each source 28-1, 28-n is monitored. For example, an ESI source 28-1 may take up a greater portion of the instrument's acquisition time than an ICP source 28-n in order for the ESI source 28-1 to provide a similar signal-to-noise ratio to that available from the ICP source 28-n.

The TOFMS 30 geometry integrates the capabilities of different types of instruments. Each type of instrument can be employed separately, or the different types of instruments can be used in parallel to achieve the additional advantages which characterize each different type of instrument. This TOFMS 30 geometry is less costly to construct and maintain. For example, several components and systems, such as vacuum pumps, power supplies, and portions of the data acquisition systems, are redundant and can be integrated to achieve cost savings. For example, the interface regions normally employed with ESI sources 28-1 and ICP sources 28-n generally have similar vacuum requirements. The TOFMS 30 geometry permits a single vacuum pump to be employed to evacuate the first stages of both vacuum interfaces, and the second and third stages of vacuum of each the ESI source 28-1 and the ICP source 28-n can be served by a single high-vacuum pump, for example, a turbomolecular pump. Additionally, the TOFMS 30 geometry permits the use of ion optics 38-1, 38-2, . . . 38-n optimized for the ion currents and ion energies produced by each distinct source 28-1, 28-2,. . . 28-n, respectively. For example, and with reference to FIG. 1, it will be appreciated that many of the ion optic electrodes 38-1, 38-n are shared by both the ESI and ICP cycles of the TOFMS 30 operation. This permits the achievement of greater sensitivity and requires less sample material than is available with a common, compromise ion optics system.

The orthogonal extraction region 35 geometry of the TOFMS 30 permits analysis of ions 32-1, 32-2, . . .32-n produced by multiple ionization sources 28-1, 28-2, 28-n simultaneously or in an interdigitated manner. Referring to FIG. 1, the sources 28-1, 28-n are oriented 180° from each other, and ions are extracted continuously in opposite directions. Each source has a distinct, differentially pumped vacuum interface in order to transfer ions from their current pressure, for example, atmospheric pressure, into a vacuum environment. Because each interface is distinct, it can be tailored to the ion flux and energy produced by the respective source 28-1, 28-n. The ion beams obtained from the sources 28-1, 28-n are then collimated and introduced into the same extraction region 35, where they are extracted for mass analysis. Because the ionization sources 28-1, 28-n are oriented in different directions, they attain different trajectories 40-1, 40-n within the drift region of the TOFMS 30 and, consequently, can be detected separately at different ion detectors 34-1, 34-n. By interdigitating or simultaneously performing these extraction events, the different types of chemical information are obtained in a very rapid manner. In essence, all the ions 32-1, . . . 32-n from multiple sources 28-1, . . . 28-n, respectively, can be extracted into the mass analyzer at the same time.

Ion Optics

Because each source 28-1, . . . 28-n is sampled through a distinct interface region, the ion optics 38-1, . . . 38-n responsible for collimating the ion beam from a respective source 28-1, . . . 28-n prior to its introduction into the extraction region 35 can be tailored to the ion flux and energy of the respective source 28-1, . . . 28-n. For example, when an ESI source 28-1 is employed, it has been shown that it is highly advantageous to dry excess solvent from the resulting plume to achieve greater sensitivity. It is also known that an ESI source 28-1 produces an isoenergetic ion beam of relatively modest intensity. The beam includes high-mass ions 32-1 possessing multiple charges. Thus, it is highly advantageous for the ion optics 38-1 and extraction system for this source 28-1 to include a drying region to desolvate ions, and electrodes which can accommodate the appropriate ion 32-1 energies. Suitable ion optics 38-1 have been described in, for example, Kim, T., et al, "Design and Implementation of a New Electrodynamic Ion Funnel," supra.; Tolmachev, A. V., et al, "Simulation-Based Optimization of the Electrodynamic Ion Funnel for High Sensitivity Electrospray Ionization Mass Spectrometry," supra.; Lynn, E. C., et al, "Characterizing the Transmission Properties of an Ion Funnel," supra.; and, Kim, T., et al, "Improved Ion Transmission from Atmospheric Pressure to High Vacuum Using a Multicapillary Inlet and Electrodynamic Ion Funnel Interface," supra. Additionally, radio frequency multipole ion guides have been employed in ion optics 38-1 in order to cool the ion beam through collisions (see, for example, Voyksner, et al, "Investigating the Use of an Octupole Ion Guide for Ion Storage and High-Pass Mass Filtering to Improve the Quantitative Performance of Electrospray Ion Trap Mass Spectrometry," supra., and Cha, B., et al, "An Interface with a Linear Quadrupole Ion Guide for an Electrospray-Ion Trap Mass Spectrometer System," supra.), or a quadrupole ion trap has been used to integrate the ion current prior to injection into the extraction region 35 of the TOFMS (see, for example, Michael, S. M., et al, "Detection of Electrospray Ionization Using a Quadrupole Ion Trap Storage/Reflection Time-Of-Flight Mass Spectrometer," supra.; Draper, W. M., "Electrospray Liquid Chromatography Quadrupole Ion Trap Mass Spectrometry Determination of Phenyl Urea Herbicides in Water," supra.; Boue, S. M., et al, "Pulsed Helium Introduction into a Quadrupole Ion Trap for Reduced Collisional Quenching During Infrared Multiphoton Dissociation of Electrosprayed Ions," supra.; Egan, M. J., et al, "Electrospray and APCI Analysis of Polyhydroxyalkaloids Using Positive and Negative Collision Induced Dissociation Experiments in a Quadrupole Ion Trap," supra.; Quarmby, S. T., et al, "Fundamental Studies of Ion Injection and Trapping of Electro-Sprayed Ions on a Quadrupole Ion Trap," supra.; Shen, J., et al, "Post-Column Metal Complexation of Quinolone Antibiotics in a Quadrupole Ion Trap," supra.; Ding, J., et al, "Advances in CE/MS," supra.; Purves, R. W., et al, "Development of an Ion Trap/Linear Time-Of-Flight Mass Spectrometer with Electrospray Ionization for Micro-Column Liquid Chromatography Detection," supra.; and, Chien, B. M., et al, "Analysis of the Fragments from Collision-Induced Dissociation of Electrospray-Produced Peptide Ions Using a Quadrupole Ion Trap Storage/Reflection Time-Of-Flight Mass Spectrometer," supra.). It is believed that either of these general types of systems can be employed as components of the present invention.

In contrast, typical ICP sources 28-n are known to produce ion beams of considerable intensity and isokinetic energy distribution, including ions 32-n of masses limited to the atomic range, roughly 1-250 a. m. u. Modified electrodes have been employed to couple ICP sources 28-n to TOFMSs 30. See, for example, Myers, D. P., et al, "An Inductively Coupled Plasma-Time-Of-Flight Mass Spectrometer for Elemental Analysis. Part I: Optimization and Characteristics," supra.

TOFMS Parameters

Figure 2:
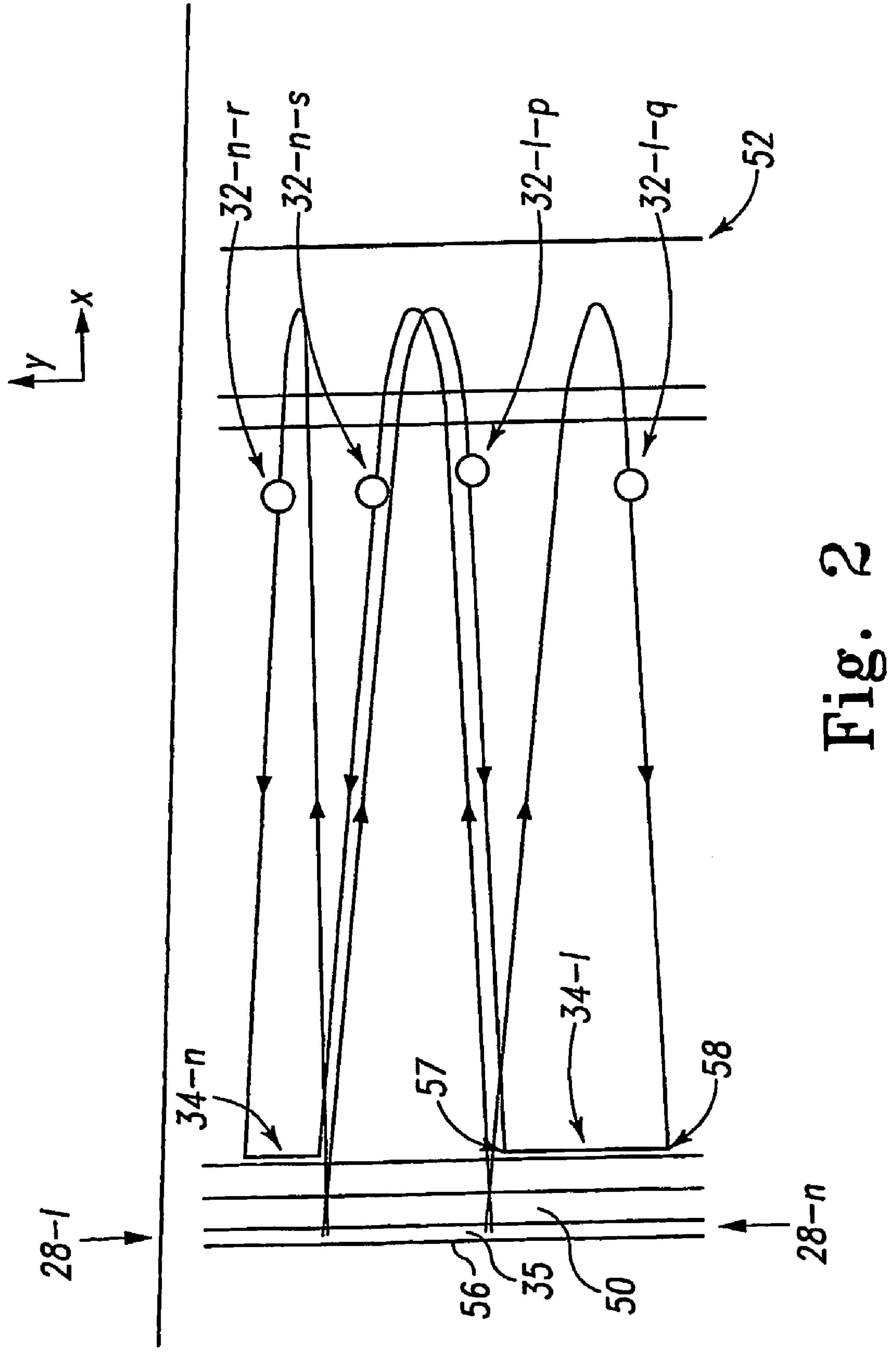
FIG. 2 illustrates an ion trajectory simulation of a simple instrument design and certain general principles of the design of an instrument according to the present invention.

The TOFMS 30 is configured to permit sampling of multiple, illustratively, two, different mass ranges of ions 32-1, . . . 32-n from multiple, for example, two, different sources 28-1, . . . 28-n. Thus, a number of different TOFMS 30 instrument geometries can serve as starting points for the design, construction and use of an instrument constructed according to the present invention. An ion trajectory 40-1, . . . 40-n simulation of a TOFMS 30 construction is illustrated in FIG. 2. FIG. 2 illustrates certain general principles of the TOFMS 30 construction according to the present invention. The TOFMS 30 illustrated in FIG. 2 is based upon a geometry generally referred to as orthogonal extraction geometry. In the orthogonal extraction geometry, ions 32-1, . . . 32-n are extracted into the acceleration region 50 along a direction perpendicular to the direction of their original motion. Therefore, depending upon the initial energy $E_y$ of an ion 32-1, . . . 32-n, the ion 32-1, . . . 32-n will attain an angle α within the flight region of the TOFMS 30, $$\alpha=\arctan(V_y/V_x)=\arctan(\mathrm{sqrt}(E_y/E_x)) \quad (1)$$

where $E_x$ is the acceleration energy, $V_y$ is the original velocity of the ion 32-1, . . . 32-n, $V_x$ is the velocity gained through acceleration, and sqrt is the square root operator. If all ions 32-1-p, . . . 32-1-q produced by the ESI source 28-1 possess the same energy (which is a reasonable estimation), it follows that all masses will attain the same angle α within the drift region and arrive at the detector 34-1 distances apart that are the same as the distances apart at which they were extracted from the source 28-1 beam. This is illustrated in FIG. 2 for the ions 32-1-p and 32-1-q, both of which possess, illustratively, 10 eV of energy; that is, $E_y$=10 eV. Independent of the mass of the ion 32-1-p, . . . 32-1-q under consideration, ions extracted from the origin of ion 32-1-p in FIG. 2 will strike an edge 57 of detector 34-1 closest to the extraction region 35, while those of the energy and origin of ion 32-1-q will contact the edge 58 of detector 34-1. Therefore, the extraction region 35 for ESI source 28-1 in this example need only be of roughly the same size as the detector 34-1 to be used to detect the ions 32-1 from that source 28-1.

In contrast, the ICP source 28-n produces an ion beam with ions 32-n having energies with both an isokinetic portion and an isoenergetic portion, resulting in a primary ion beam trajectory 32-n-r, . . . 32-n-s that depends upon mass. Ions 32-n-r, . . . 32-n-s having different masses extracted from an identical origin within the extraction region 35 will attain different angles within the flight region, and consequently, will strike the detector 34-n at different positions. In order to minimize this mass bias, the extraction region 35 must be designed to accommodate a range of ion 32-n-r, . . . 32-n-s energies and therefore must be of a much larger size. FIG. 2 also illustrates two ICP ions 32-n-r, 32-n-s. ICP ions 32-n-r, 32-n-s have different energies representing the boundaries of the energy window sampled by the extraction region 35 of, illustratively, 10 cm width by a detector 34-n having a diameter of, illustratively, 4.4 cm.

Another parameter of interest in the design of an instrument is the relationship between the time required to refill the extraction region 35 and the time required to complete a mass analysis. This parameter practically dictates the duty factor of the instrument, and therefore both the instrument's efficiency and the instrument's sensitivity. The repetition rate of the typical TOFMS is limited by the time required for the ion 32-1, . . . 32-n of greatest m/z, and therefore having the lowest velocity, to traverse the flight region and strike the detector 34-1, . . . 34-n. When a continuous ionization source 28-1, . . . 28-n is employed, it is also limited by the time required for the incoming ion beam from source 28-1, . . . 28-n to fill the extraction region 35 in a manner that does not create a mass bias effect. For example, a monoenergetic ion beam sampled by the TOFMS 30 will obey the relation:

$$d \leqq a(\mathrm{sqrt}(2E_y)) \quad (2)$$

where $E_y$ is the energy of the beam, d is either the detector 34-1, . . . 34-n width along the y-axis or the width of the extraction region 35, whichever is limiting, and a is the instrument-defined proportionality dependent upon the particular instrument, and is derived from the flight time relation $$\text{time-of-flight (as a function of } m/z)=a(\mathrm{sqrt}(m/z)) \quad (3)$$

If the beam contains all masses up to the equivalent m/z=1000, then extraction must not take place until that particular mass has filled the extraction region 35. In this way, it is assured that the ions 32-1, . . . 32-n extracted are an accurate reflection of the composition of the incoming ion beam. It may be noted that $d \leqq a(\mathrm{sqrt}(2E_y))$ is independent of m/z. This is so because the increased flight time with increased m/z compensates for the longer time required to fill the extraction region 35. For a monoenergetic beam of 10 eV energy and a fairly typical value for a of $1.8\times10^{-6}$, the limiting dimension is 8.3 cm.

For an isokinetic ion 32-1, . . . 32-n beam, the situation is different because each m/z is traveling at the same velocity. Therefore, each m/z possesses an energy $E_y$ that varies linearly with mass. Accordingly, the size of the region 35, and therefore the refill time, varies with the mass range under investigation. Because each mass possesses a different energy, extraction must be delayed until the range of m/z in question has had enough time to pass to the appropriate position within the extraction region 35 from whence it can strike the detector 34-1, . . . 34-n surface. The time required to refill the extraction region 35 is related to the mass range under investigation by the relation $$\text{refill time}=a(\mathrm{sqrt}((m/z)_{HIGH})-\mathrm{sqrt}((m/z)_{LOW})) \quad (4)$$

where $(m/z)_{HIGH}$ is the greatest (m/z) which will be sampled and $(m/z)_{LOW}$ is the smallest (m/z) which will be sampled. In the case of an isokinetic ion beam, therefore, the refill time is independent of the velocity of the incoming ion beam and dependent only on the acceleration attributable to the instrument. For a typical ICP-TOFMS, (e.g. $a=1.8\times10^{-6}$) the mass range of interest might be from about m/z=2 to about m/z=250. This would yield a maximum repetition rate (1/fill rate) of about 39 KHz. For comparison, the maximum repetition rate determined by time of flight would be about 35 KHz.

If the ion beam of interest has both isokinetic and monoenergetic properties (the typical situation in, for example, an ion beam from ICP source 28-n), the calculations become more complex. Because the beam exhibits both isokinetic and monoenergetic properties, the refill time and dimensions are dependent on the mass range, $M_{HIGH}$ to $M_{m/z}$, on the detector 34-n size, DETECTOR, on the offset potential, $E_0$, on the expansion temperature, T, and on the time-of-flight parameter a. The refill time can be calculated from the relation $$\text{refill time}(M_{m/z})=(\text{DETECTOR}+a\,\text{sqrt}(Avq)((\text{sqrt}((5M_{HIGH}kT+2E_0M_{Ar}q)/M_{Ar}q)-\text{sqrt}((5M_{m/z}kT+2E_0M_{Ar}q)/M_{Ar}q)))/\text{sqrt}((5M_{m/z}kT+2E_0M_{Ar}q)/M_{Ar}M_{m/z}) \quad (5)$$

where $M_{Ar}$ is the mass of the bath gas (argon in this example), k is Boltzmann's constant, q is the elemental charge, and Av is Avogadro's number. The m/z possessing the limiting refill time changes depending upon the relative magnitudes of the temperature and offset potential, but will always be less than that dictated by the isokinetic expansion case.

All TOFMSs attempt to compensate for the initial spatial distribution of the ions in order to reduce errors in flight time. Generally this is presently accomplished by space focus techniques that are well documented in the prior art. Because the space focus plane location is independent of m/z, a single set of instrument conditions will suffice for ion sources 28-1, . . . 28-n. Under conditions in which the field strengths within the extraction region 35 and acceleration region 50 illustrated in FIG. 2 are equal in magnitude, the second-order primary space focus plane is located at a distance equal to the length of the extraction region 35 plus twice the length of the acceleration region 50 from the end of the acceleration region 50. In considering other extraction region geometries, these space focus conditions need to be observed.

TOFMSs also employ energy compensation techniques, such as an ion mirror, in order to compensate for the distribution of initial velocities among the ions 32-1, . . . 32-n that are extracted. The degree to which velocity distribution errors are compensated is frequently expressed in terms of the reduced flight time difference (δt/T) as a function of acceleration potential defect (δU/U). Under most conditions, the ions 32-1, . . . 32-n from the different sources 28-1, . . . 28-n experience the same acceleration potentials. Therefore, it is possible to use the same reflectron 52 configuration for ion sources 28-1, . . . 28-n. If the extraction regions 35 of the ions 32-1, . . . 32-n from the sources 28-1, . . . 28-n are different, and in some cases in which they are identical, it may be advantageous to employ two distinct reflectrons 52. It is also possible to employ reflectron(s) 52 as a means of increasing the a factor, and thus the offset distances of the ions' masses.

Two measures of efficiency may be calculated for an instrument constructed according to the present invention. One is the duty cycle relating to the analysis of ions 32-1, . . . 32-n produced by the respective ion sources

28-1, . . . 28-n. The duty cycle as it relates to each source 28-1, . . . 28-n can be calculated as follows:

$$\text{duty cycle}=(f_{source}d_{source})/\text{Vel}_{source} \quad (6)$$

where $f_{source}$ is the number of extraction events for a particular source 28-1, . . . 28-n per second, $d_{source}$ is the extraction region 35 width, and $\text{Vel}_{source}$ is the average velocity of the ions 32-1, . . . 32-n in the primary (pre-extraction) beam produced by that source 28-1, . . . 28-n. If gating is employed, the duty cycle reduces to the product of the TOFMS 30 frequency and the modulation gate pulse width, but remains limited in the maximum by this function.

Another measure of efficiency which is useful in comparing an instrument constructed according to the present invention to the prior art is the source partition ratio pertaining to the fraction of the analysis time allocated to each source 28-1, . . . 28-n. The source partition ratio is defined as the ratio of the time ions 32-1, . . . 32-n from each source 28-1, . . . 28-n are measured to the available analysis time. For example, in a two-source 28-1, 28-n apparatus and method, a ratio of 3:1 would indicate three extraction events from source 28-1 for every single extraction event from source 28-n.

Extraction Region Geometries, Extraction Sequences and Ion Gating

FIGS. 3A-D illustrate several potential extraction region 35 geometries useful with methods and apparatus constructed according to the invention. The extraction region 35 is defined generally as the region between repeller 56 and a first acceleration electrode 58. Ions are extracted for mass analysis by application of a voltage pulse VR to one or both of the electrodes. Again, the simplest form illustrated in FIG. 3A, a single region with no beam offset, projects ion beams from ion sources 28-1, 28-n along the same axis, but in opposite directions. In this embodiment, a single extraction pulse might simultaneously inject ions from sources 28-1, 28-n into the acceleration region. As the ions travel through the potential gradient, the ion energy distributions of the ion populations are identical. Thus, many of the same ion optics and reflectron 52 potentials can be employed for sources 28-1, 28-n.

Figure 3A:
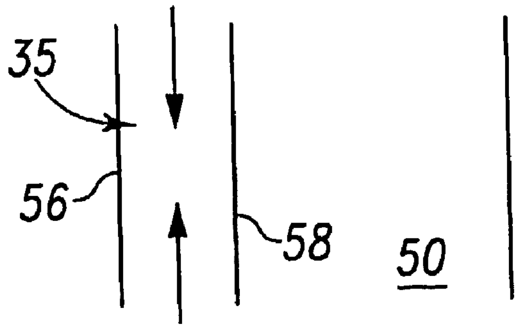
FIGS. 3A-D illustrate extraction region geometries useful with methods and apparatus constructed according to the invention.
Figure 3B:
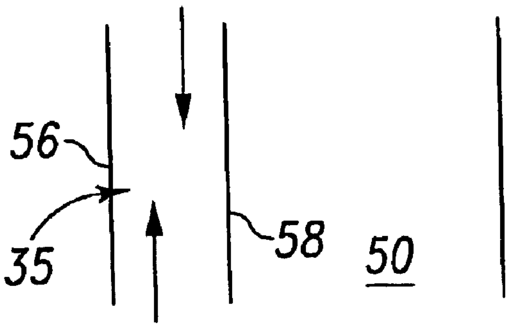

In another embodiment, illustrated in FIG. 3B, the beam axes are spatially offset along the x-axis, that is, along the direction of the flight tube, within the extraction region 35. Because the beams are not coaxial, difficulties created by collisions of ions from one source 28-1 with those from another source 28-n and collisions of ions with neutral beams of atoms created by the sampling process are reduced. All populations of ions 32-1, 32-n are subjected to the same field upon extraction. However, because the initial position of each population is different, each possesses a different spatially-dependent energy. While the space-focus plane position remains the same for each population, the ion optics 38-1, 38-n potentials and reflectron 52 potentials may be somewhat different for different beams.

Figure 3C:
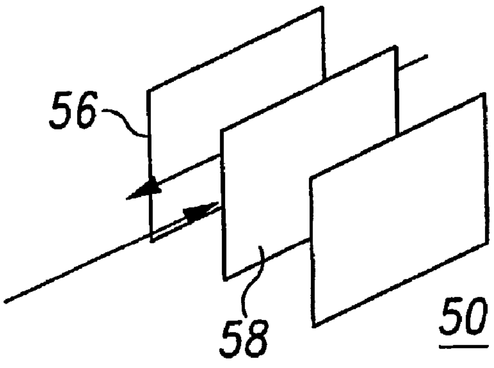

FIG. 3C illustrates an embodiment in which the ion beams are vertically offset. In such an embodiment, separate extraction regions (not shown) may be created for each source 28-1, 28-n.

Figure 3D:
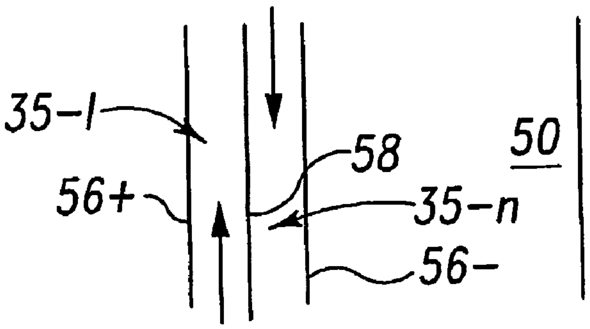
Figure 4:
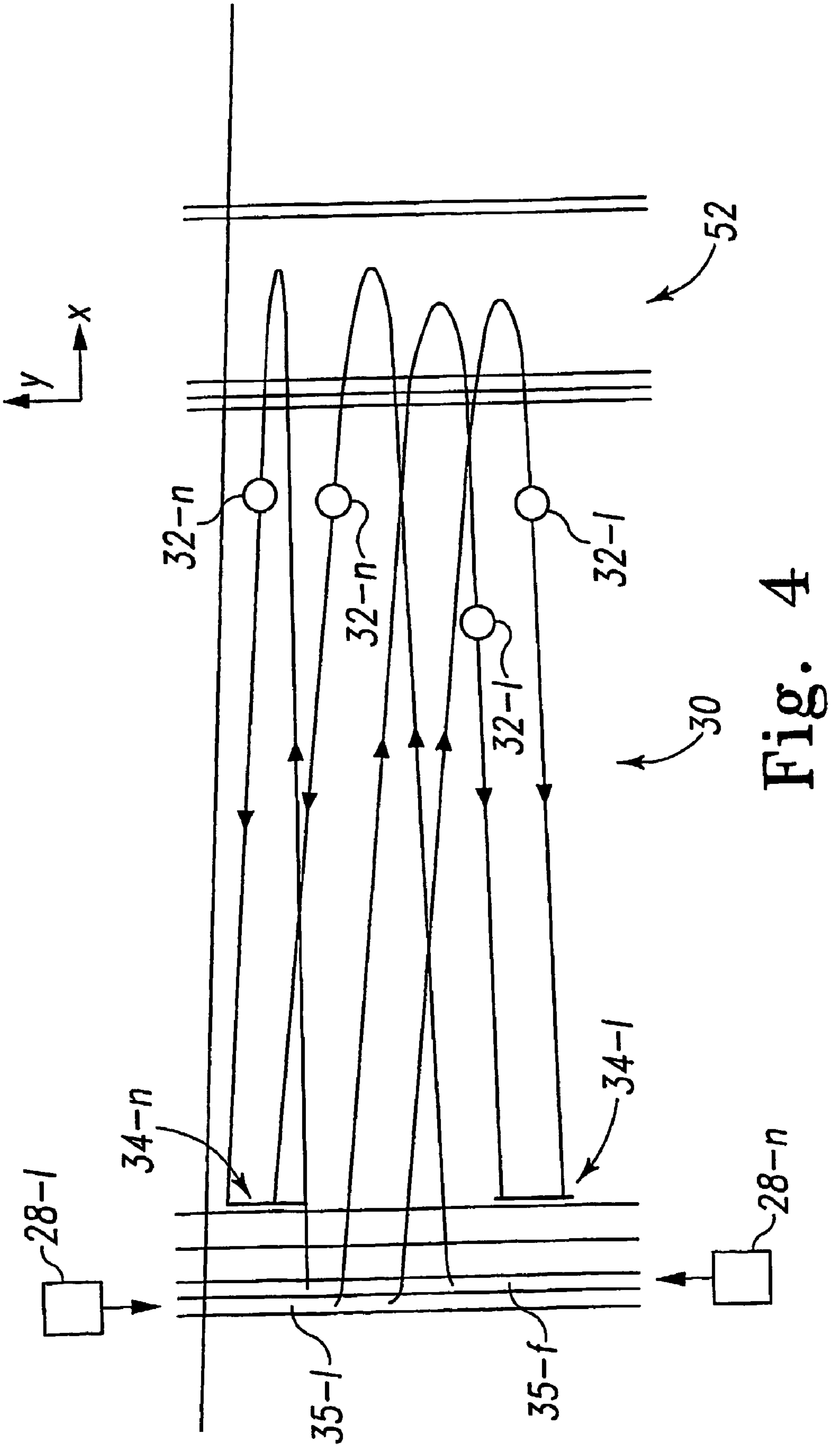
FIG. 4 illustrates a component geometry useful in methods and apparatus according to the invention.
Figure 5:
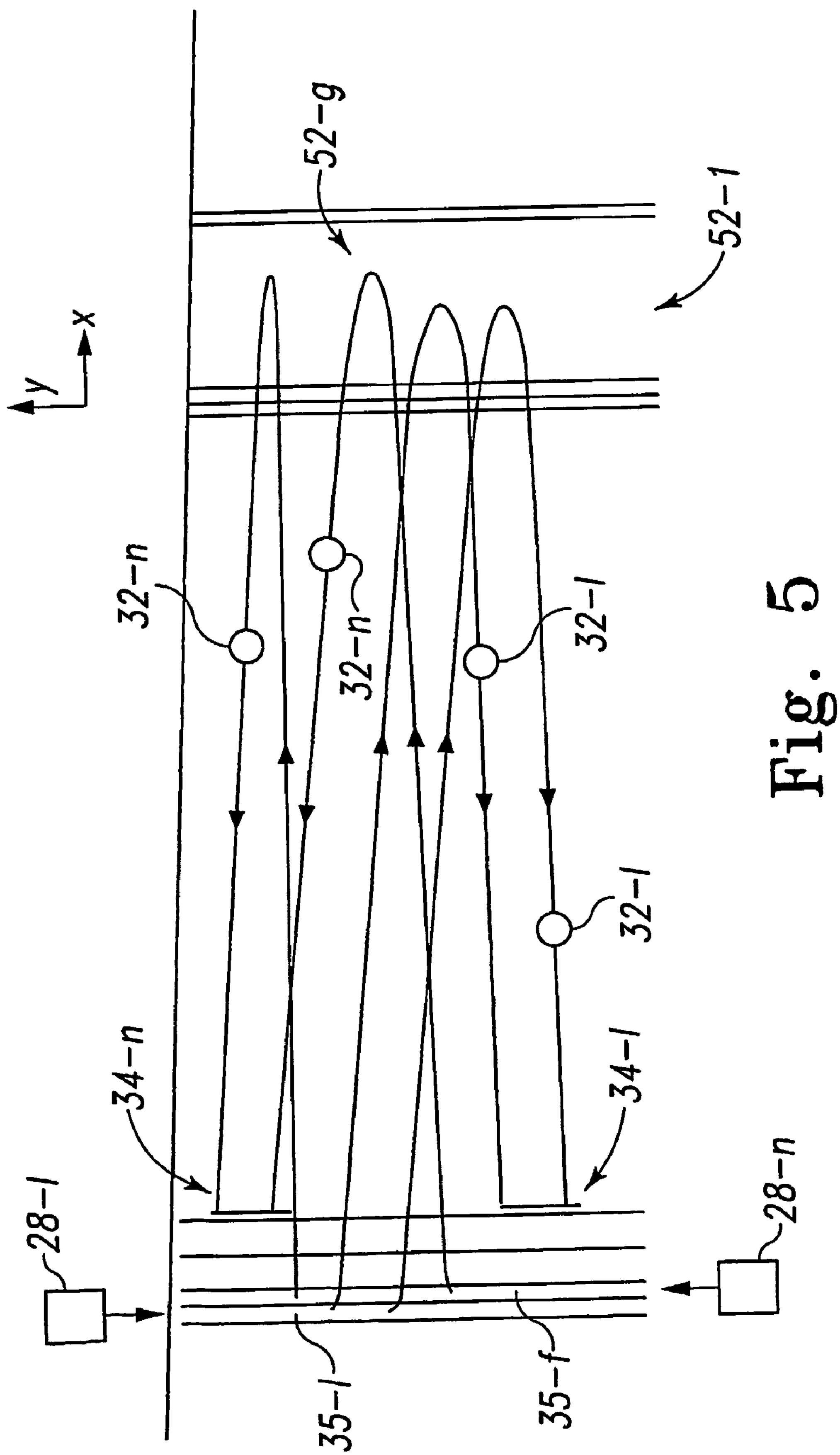
FIG. 5 illustrates a component geometry useful in methods and apparatus according to the invention.

FIG. 3D illustrates a multiple extraction region embodiment in which each ion beam is injected into a separate extraction region 35-1, 35-n. In FIG. 3D, ions from source 28-n are injected into the negative injection region. When an extraction is to take place, a negative repeller pulse is applied to the grid 56– and the ions from source 28-n are pulled into the acceleration region 50. Ions from source 28-1 are injected into the positive extraction region 35-1. When a positive potential is applied to the repeller 56+ and a negative potential is applied to the negative repeller 56−the ions are pulled into the acceleration region 50. In this way, the electric field gradient remains constant throughout each extraction region 35-1, 35-n, and space-focus conditions are thus satisfied. In this embodiment, the space-focus plane will be in a different position for each ion population. Thus, reflectron 52 conditions and ion optics 38-1, 38-n conditions will be different for each ion 32-1, 32-n population. Other geometries can be implemented as well. For example, other embodiments can include ones with segmented extraction regions 35-1, . . . 35-f, as illustrated in FIGS. 4 and 5, and ones with segmented reflectrons 52-1, . . . 52-g, as illustrated in FIG. 5.

Figure 6:
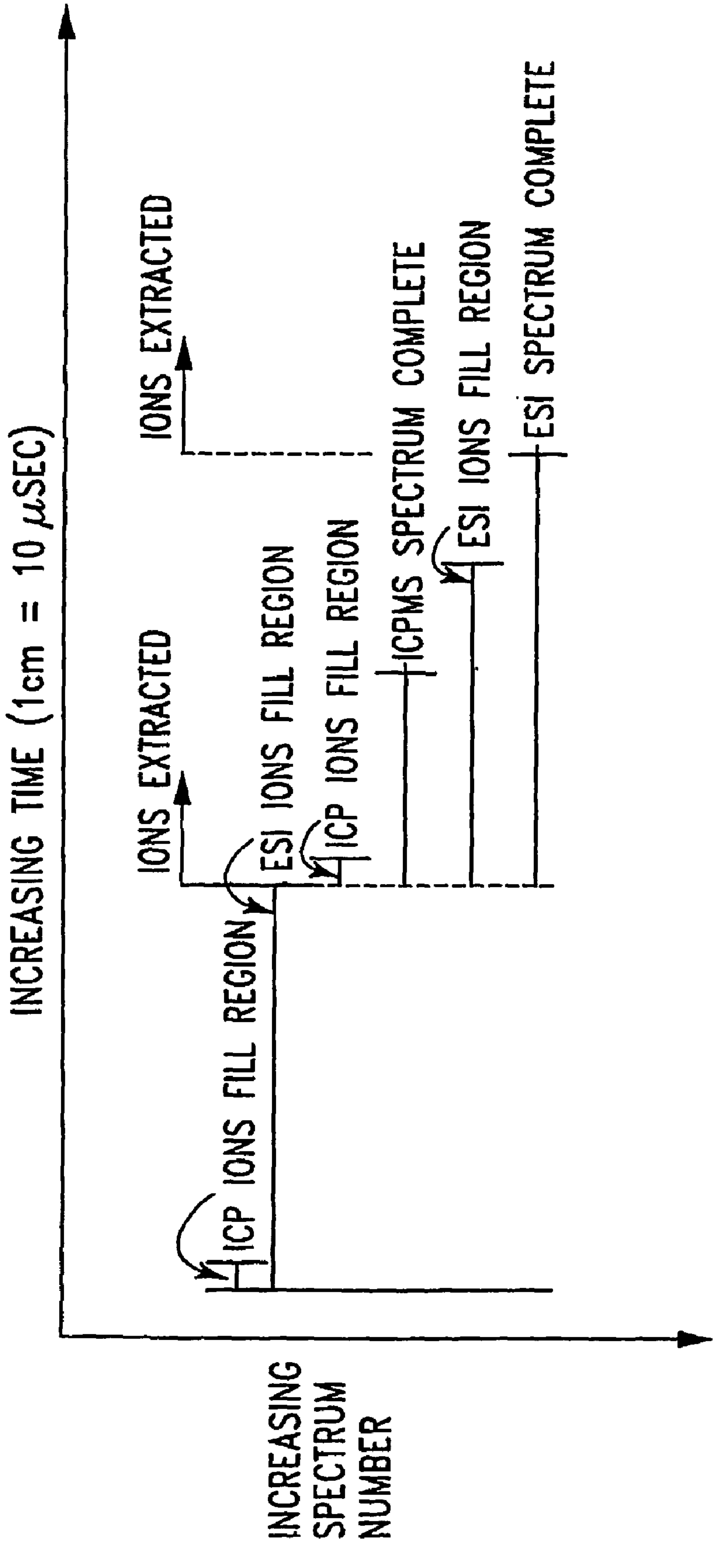
FIG. 6 illustrates a timing sequence useful in methods and apparatus according to the invention; and, FIGS. 7A-D illustrate another embodiment of the invention and timing and gating sequences for that embodiment.

As previously noted, extractions from multiple sources 28-1,. . 28-n can be accomplished simultaneously or interdigitated. When ions 32-1, . . . 32-n from multiple sources 28-1, . . . 28-n are injected simultaneously into the TOFMS 30, the repetition rate of the instrument will be limited by the lesser (least) of the attainable repetition rates for the particular sources 28-1,. . . 28-n. As previously discussed, this, in turn, will depend upon the mass ranges in question, the ion beam energies, and the size(s) of the extraction region(s) 35. As an illustration, consider an instrument having an ESI ion source 28-1 and an ICP ion source 28-n, parameters as discussed above, and an extraction region 35 of the type illustrated in FIGS. 3A-C. FIG. 6 illustrates a timing sequence of such a system. The duration of each step in the sequence is scaled in the horizontal direction of increasing time. The vertical dimension illustrates different spectra.

With an acceleration creating a TOFMS factor $a=1.8\times10^{-6}$, an ICP-TOFMS spectrum takes 28 μsec to complete. An ESI spectrum can be collected in about 57 μsec. If the ICP source 28-n produces elemental ions 32-n of a typical experimental composition (gas temperature T=5000° K, monoenergetic offset=2 eV), the extraction region 35 should be 6.0 cm long, assuming a typical 4.4 cm detector 34-n, according to equation (5) above. In order to promote maximum accuracy in the sampling of the ion 32-n beam, a minimum time of 2.8 μsec is required to fill the extraction region 35 with ICP ions 32-n. The ions 32-1 produced by ESI source 28-1 (monoenergetic up to m/z=1000 and possessing $E_y$=10 eV) require 43 μsec to traverse the same 6.0 cm distance. By limiting the ESI detector 34-1 size, the refill time is reduced proportionally. A 4.4 cm detector 34-1 requires 32 μsec to refill, while the 28 μsec spectral window of the ICP spectra would require a detector 34-n of 3.8 cm diameter or less. However, practically, the time required to collect the mass spectra alone will be the deciding factor in detector 34 size. In this example, the repetition rate of the ICP-TOFMS portion of the instrument will be about half the maximum repetition rate.

Figure 7A:
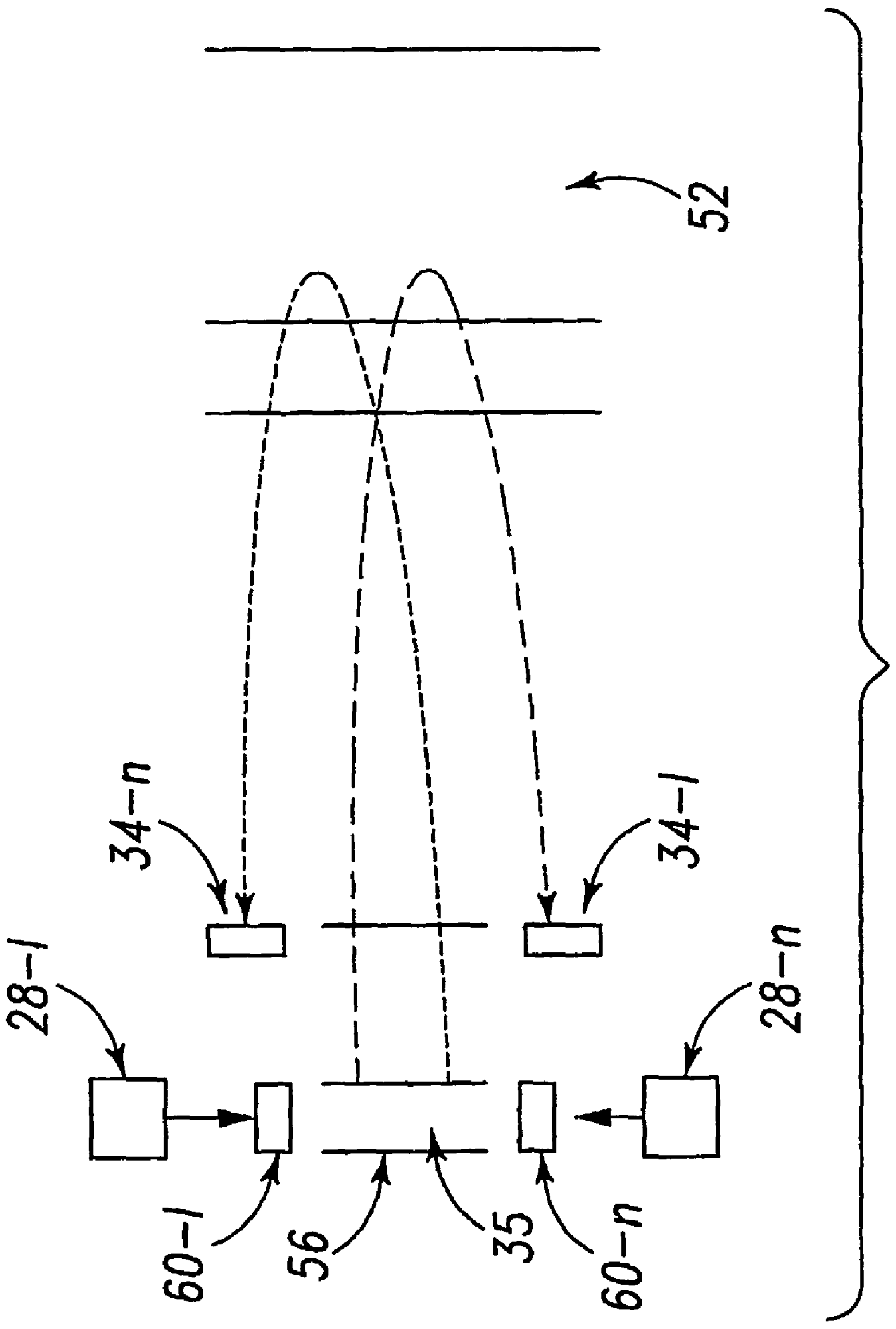
Figure 7B:
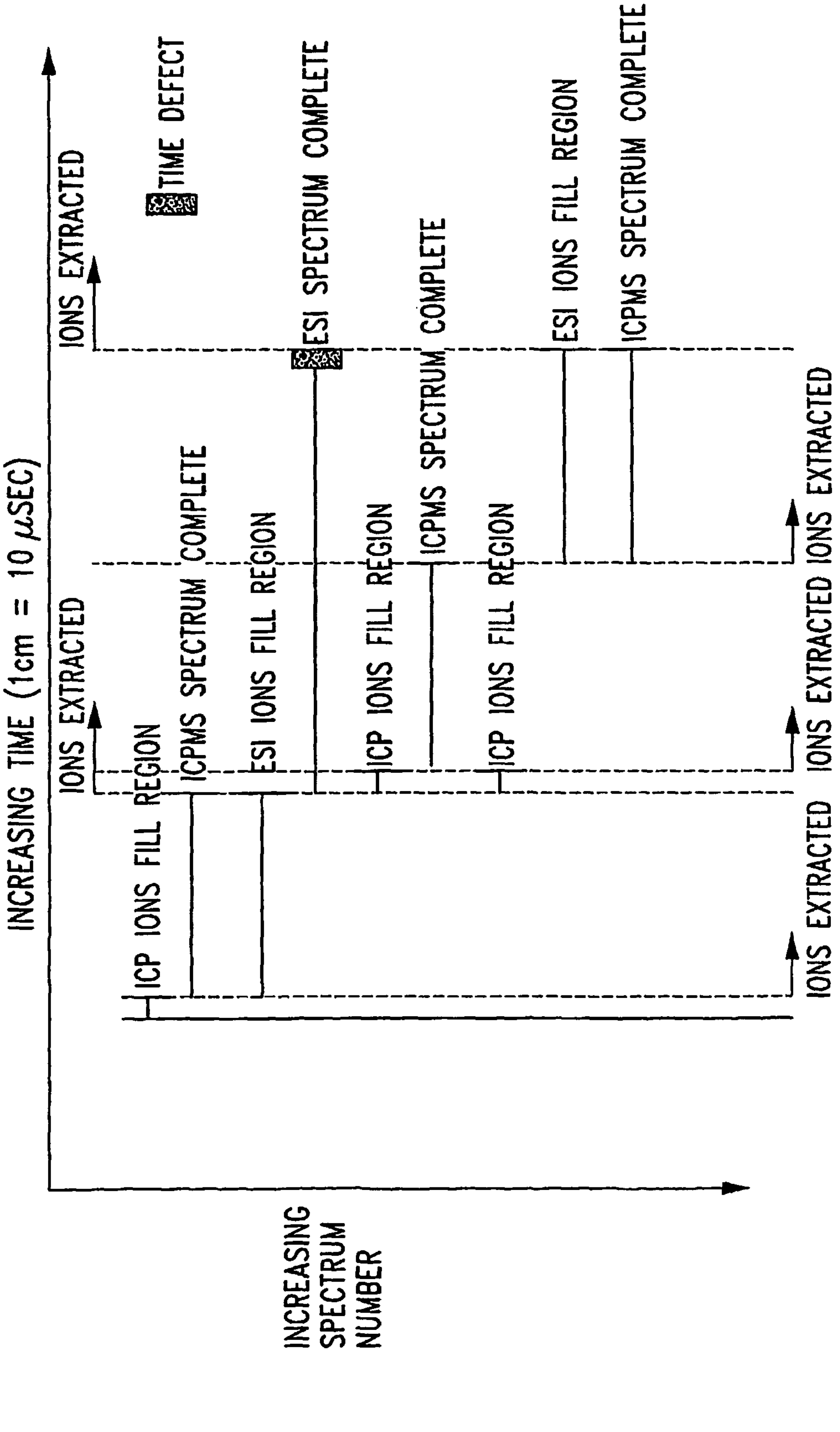
Figures 7C, 7D:
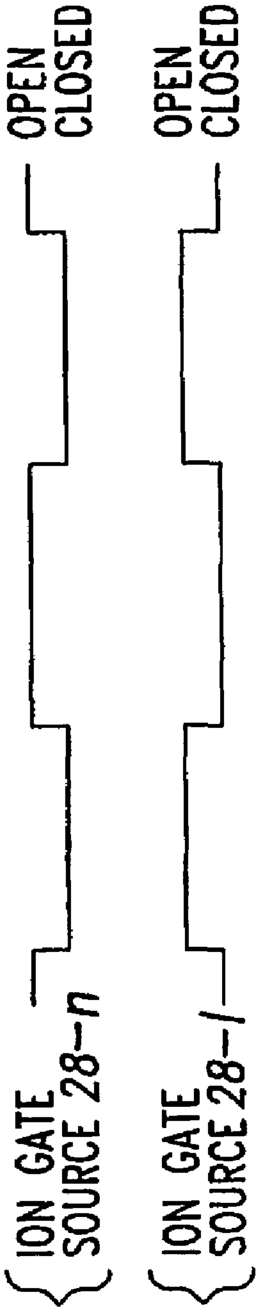

In other embodiments, extractions occur in an interdigitated manner (e.g. see FIG. 7). Ion gating methods and ion gating apparatus 60-1, . . . 60-n are employed to stop ion beams from all sources 28-1, . . . 28-n but one, 28-k, from entering the extraction region 35. The ion beam from source 28-k is permitted to fill the extraction region 35. By thus interdigitating the spectra, refill time is the only limiting factor. A highly diagrammatic view of a TOFMS 30 including gating of two sources 28-1, 28-n, an illustrative timing sequence and illustrative gating sequences for such an interdigitated embodiment are illustrated in FIGS. 7A-D, respectively. A sequence using the apparatus illustrated in FIG. 7A might proceed as follows: first, an ICP-TOFMS extraction sequence; immediately followed by filling the extraction region 35 with ions from an ESI ion beam. By limiting the detector size to less than 3.8 cm, the ESI ions can be extracted at the point following completion of the acquisition of the ICP mass spectrum. Again, this will be about 28 μsec. Immediately thereafter, the ion gates 60-1, 60-n are switched, as illustrated in FIGS. 7C-D, cutting off access by the ESI ions 32-1 to the extraction region 35, and permitting the ICP ions 32-n to begin to fill the extraction region 35. Shortly thereafter, for example, in about 2.8 μsec, the ICP ions 32-n will have filled the extraction region 35 sufficiently to provide a reasonably accurate sample, and an ICP mass spectrum is collected. Because of the relatively much longer time to obtain an ESI spectrum, it may be beneficial to keep the ICP ion beam gate 60-n open and obtain another ICP mass spectrum before closing the ICP gate 60-n and reopening the ESI beam gate 60-1 to extract another ESI spectrum. This way, during the time that the second ESI spectrum data is being collected, both ICP spectra can be analyzed. Then, this sequence of steps can be repeated.

While the disclosure has been illustrated and described in detail in the foregoing description, such illustration and description is to be considered as exemplary and not restrictive in character, it being understood that only the preferred embodiments have been shown and described and that all changes and modifications that come within the spirit of the disclosure are desired to be protected. For example, the single extraction region 35 in the present design could be replaced by two or more extraction regions 35-1, . . .35-n, all of which are configured to send ions simultaneously or in an interdigitated manner to a single detector 34.

The invention claimed is:

1. A method of acquiring chemical information with a mass spectrometer having (i) a first ionization source of a first type for creating ions, (ii) a second ionization source of a second type different from the first type for creating ions, (iii) a first detector for detecting ions, and (iv) a second detector for detecting ions, comprising:

(a) simultaneously sampling ions created by said first ionization source and said second ionization source so as to produce a first ion sample and a second ion sample; and (b) simultaneously detecting ions from said first ion sample with said first detector and ions from said second ion sample with said second ion detector.

2. A time-of-flight mass spectrometer including apparatus for coupling at least two different ion streams simultaneously to the time-of-flight mass spectrometer from at least two different types of ion sources.

3. The apparatus of claim 2 wherein one of the at least two different types of ion sources comprises an electrospray ionization source.

4. The apparatus of claim 3 wherein one of the at least two different types of ion sources comprises an inductively coupled plasma source.

5. The apparatus of claim 2 wherein one of the at least two different types of ion sources comprises an electron-impact ionization apparatus.

6. The apparatus of claim 2 wherein one of the at least two different types of ion sources comprises an inductively coupled plasma source.

7. The apparatus of claim 6 wherein one of the at least two different types of ion sources comprises an electron-impact ionization apparatus.

8. The apparatus of claim 2 wherein one of the at least two different types of ion sources comprises an electron-impact ionization apparatus.

9. The apparatus of claim 2 wherein one of the at least two different types of ion sources comprises a matrix-assisted laser desorption ionization apparatus.

10. A method of operating a time-of-flight mass spectrometer including providing at least two different types of ion sources, and coupling ion streams simultaneously from the at least two different types of ion sources to the time-of-flight mass spectrometer.

11. The method of claim 10 wherein providing at least two different types of ion sources comprises providing an electrospray ionization source.

12. The method of claim 11 wherein providing at least two different types of ion sources comprises providing an inductively coupled plasma source.

13. The method of claim 11 wherein providing at least two different types of ion sources comprises providing a matrix-assisted laser desorption ionization apparatus.

14. The method of claim 10 wherein providing at least two different types of ion sources comprises providing an inductively coupled plasma source.

15. The method of claim 14 wherein providing at least two different types of ion sources comprises providing an electron-impact ionization apparatus.

16. The method of claim 10 wherein providing at least two different types of ion sources comprises providing an electron-impact ionization apparatus.

17. The method of claim 10 wherein providing at least two different types of ion sources comprises providing a matrix-assisted laser desorption ionization apparatus.

18. A method of operating a time-of-flight mass spectrometer including providing at least two different types of ion sources, first coupling an ion stream from a first one of said ion sources of a first type into the time-of-flight mass spectrometer, next coupling an ion stream from a second one of said ion sources of a second type different from the first type into the time-of-flight mass spectrometer, next coupling an ion stream from the second one of said ion sources into the time-of-flight mass spectrometer, next coupling an ion stream from the first one of said ion sources into the time-of-flight mass spectrometer, developing mass spectra from the coupling of ion streams from said second one of said ion sources into the time-of-flight mass spectrometer while coupling an ion stream from said first one of said ion sources into the time-of-flight mass spectrometer and developing mass spectra from the coupling of ion streams from said first one of said ion sources into the time-of-flight mass spectrometer while coupling an ion stream from said second one of said ion sources into the time-of-flight mass spectrometer.

19. The method of claim 18 wherein coupling an ion stream from the first one of said ion sources into the time-of-flight mass spectrometer comprises coupling an ion stream from an electrospray ionization source into the time-of-flight mass spectrometer.

20. The method of claim 19 wherein coupling an ion stream from the second one of said ions sources into the time-of-flight mass spectrometer comprises coupling an ion stream from an inductively coupled plasma source into the time-of-flight mass spectrometer.

21. The method of claim 19 wherein coupling an ion stream from the second one of said ions sources into the time-of-flight mass spectrometer comprises coupling an ion stream from a matrix-assisted laser desorption ionization apparatus into the time-of-flight mass spectrometer.

22. The method of claim 19 wherein coupling an ion stream from the second one of said ions sources into the time-of-flight mass spectrometer comprises coupling an ion stream from an electron-impact ionization apparatus into the time-of-flight mass spectrometer.

23. The method of claim 18 wherein coupling an ion stream from the first one of said ions sources into the time-of-flight mass spectrometer comprises coupling an ion stream from an inductively coupled plasma source into the time-of-flight mass spectrometer.

24. The method of claim 23 wherein coupling an ion stream from the second one of said ions sources into the time-of-flight mass spectrometer comprises coupling an ion stream from a matrix-assisted laser desorption ionization apparatus into the time-of-flight mass spectrometer.

25. The method of claim 23 wherein coupling an ion stream from the second one of said ions sources into the time-of-flight mass spectrometer comprises coupling an ion stream from an electron-impact ionization apparatus into the time-of-flight mass spectrometer.

26. The method of claim 18 wherein coupling an ion stream from the first one of said ions sources into the time-of-flight mass spectrometer comprises coupling an ion stream from a matrix-assisted laser desorption ionization apparatus into the time-of-flight mass spectrometer.

27. The method of claim 26 wherein coupling an ion stream from the second one of said ions sources into the time-of-flight mass spectrometer comprises coupling an ion stream from an electron-impact ionization apparatus into the time-of-flight mass spectrometer.

28. The method of claim 18 wherein coupling an ion stream from the first one of said ions sources into the time-of-flight mass spectrometer comprises coupling an ion stream from an electron-impact ionization apparatus into the time-of-flight mass spectrometer.

* * * * *